Figure 1:
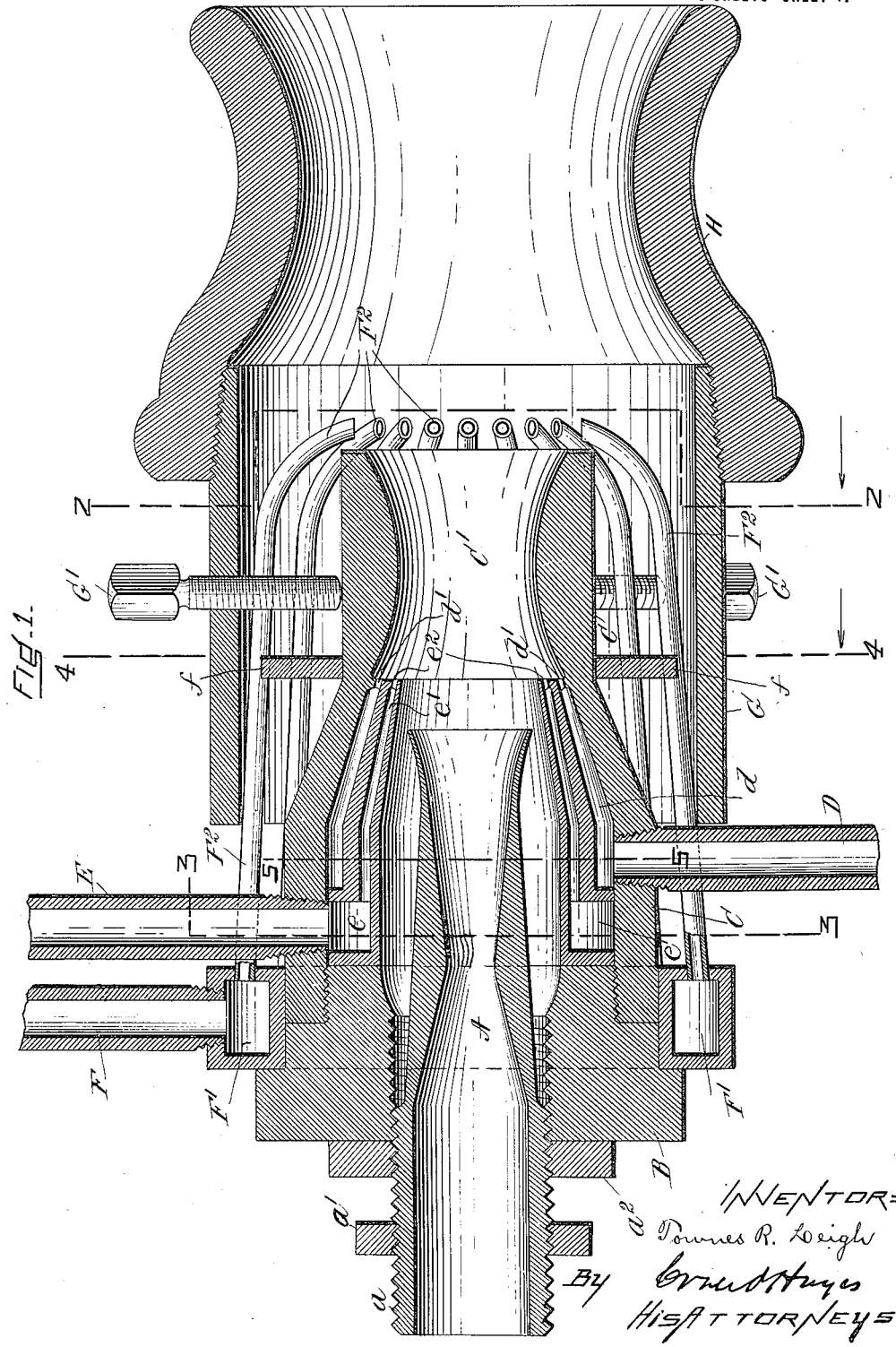
Figure 2:
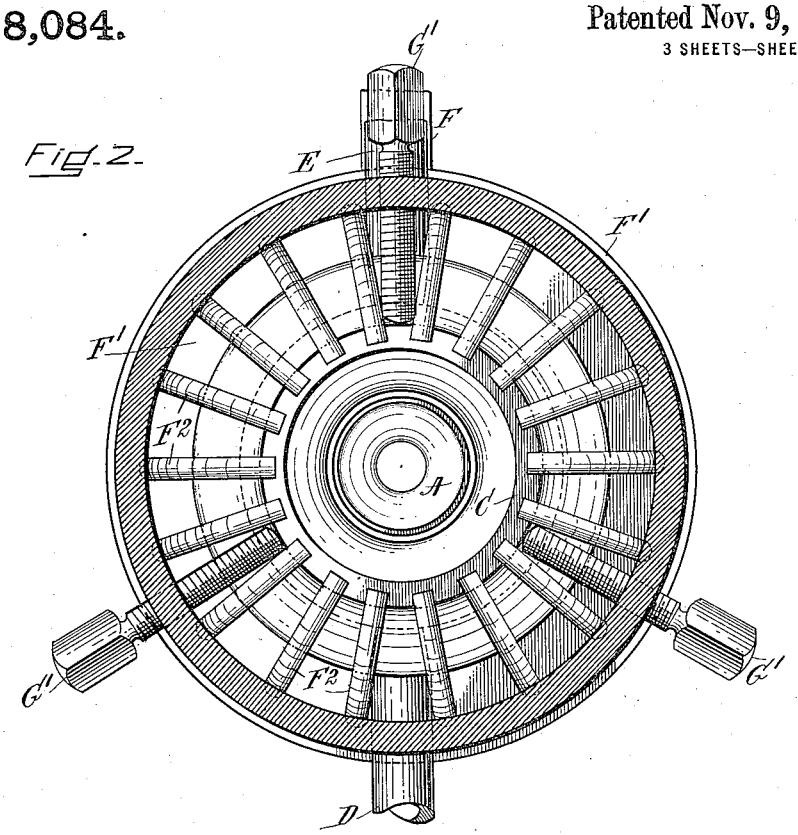
Figure 3:
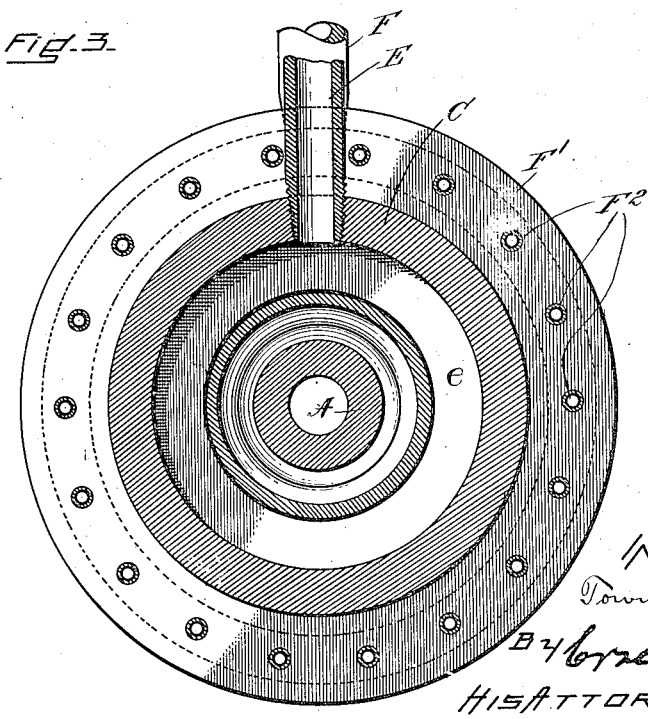
Figure 4:
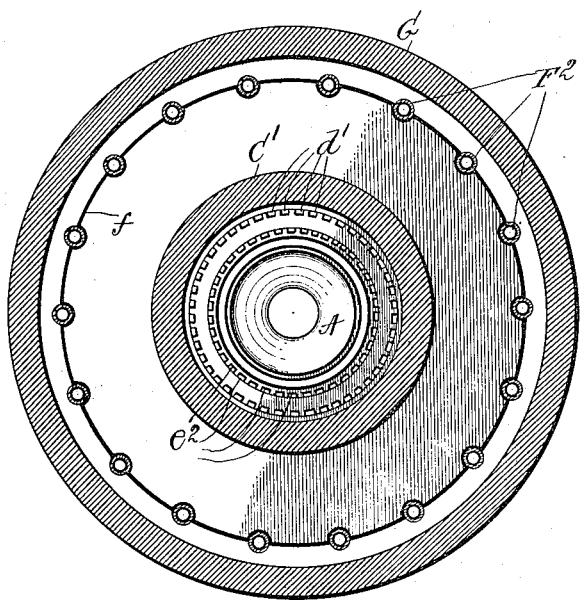
Figure 5:
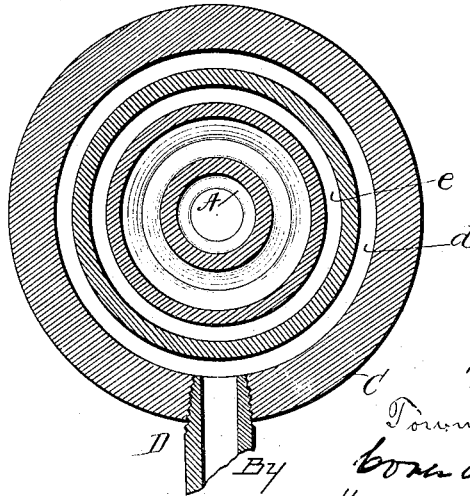

T. R. LEIGH.
METHOD OF PRODUCING FOG SCREENS.
APPLICATION FILED DEC. 18, 1918.

1,358,084.

Patented Nov. 9, 1920.
3 SHEETS—SHEET 2.

INVENTOR:
Townes R. Leigh
BY
HIS ATTORNEYS:

UNITED STATES PATENT OFFICE.

TOWNES R. LEIGH, OF GEORGETOWN, KENTUCKY, ASSIGNOR TO SUBMARINE SIGNAL COMPANY, OF PORTLAND, MAINE, A CORPORATION OF MAINE.

METHOD OF PRODUCING FOG-SCREENS.

1,358,084.   Specification of Letters Patent.   Patented Nov. 9, 1920.

Application filed December 18, 1918. Serial No. 267,392.

*To all whom it may concern:*

Be it known that I, TOWNES R. LEIGH, a citizen of the United States, and a resident of Georgetown, in the county of Scott and State of Kentucky, have invented a new and useful Improvement in Methods of Producing Fog-Screens, of which the following is a specification.

My invention relates to a method and means for producing what is ordinarily termed a "smoke screen" although my screen as preferably used is not a smoke color but more in the nature of a cloud of mist, light in color.

My invention consists in making a screen by supplying to the atmosphere nuclei around which a vapor will tend to condense and cluster and so form an opaque fog or cloud which will conceal one or more ships or may be used for other concealment. This may be done by the use preferably of steam shot into the atmosphere in a stream under considerable pressure, and feeding into a stream of steam, or the like, acid chlorids such as sulfur-chlorid, phosphorus chlorids, chromyl chlorid, anhydrous tin tetrachlorid, silicon tetrachlorid and other bodies which upon hydrolysis yield one or more acids, these acids later being brought into contact with ammonia so as to form their respective salts.

In its preferred form this cloud consists of ultra-microscopic particles of sulfur, ammonium chlorid and ammonium hydrosulfite with a trace of ammonium thiosulfate, and water in the form of steam.

This cloud is produced by first causing sulfur-chlorid (two molecules) to interact with one equivalent (three molecules) of water in the form of live steam.

The sulfur-chlorid has been introduced to the steam in the following manner: A steam jet thrown from a small nozzle under considerable pressure is made to pass through a jacket into which the sulfur-chlorid is sucked by the jet of steam. This jacket surrounds the nozzle and has two concentric circles of small orifices so arranged about the nozzle that the sulfur-chlorid is drawn into the steam jet. A chemical action here takes place. Two molecules of sulfur-chlorid interact with three molecules of water in the form of live steam to form one part of sulfurous acid (water plus $SO_2$), three parts of sulfur and four molecules of hydrogen chlorid, and a trace of $H_2S_2O_3$.

$$2S_2Cl_2 + 3H_2O = H_2SO_3(H_2O+SO_2) + 3S + 4HCl.$$

This equation represents practically the chemical action.

Anhydrous ammonia is then added under its own pressure and two of the chemicals previously formed, namely: sulfurous acid plus hydrogen chlorid ($H_2SO_3 + 4HCl$) interact with chemical equivalents of ammonia so that the acids are neutralized and form their corresponding salts, ammonium hydrosulfite and ammonium chlorid, respectively, $4NH_4Cl + NH_4HSO_3$.

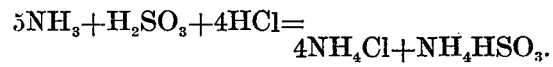
$$5NH_3 + H_2SO_3 + 4HCl = 4NH_4Cl + NH_4HSO_3.$$

The cloud or fog as above made, therefore, consists of sulfur, ammonium chloride and ammonium hydrogen sulfite chiefly. The quantity of steam is largely in excess of the amount taken up in the reactions. These chemicals are in a finely divided state and serve as nuclei around which cluster much of the excess of the steam which did not combine chemically according to the equation above, to form the cloud or fog. Photometric measurements show that this cloud or fog will stand great dilution. No rifts appear in the cloud. Being composed of particles heavier than air it settles well on the surface of the sea or land.

The water in the form of steam is thus used both chemically and physically, chemically to hydrolyze the sulfur chlorid and physically to form particles which will cluster around the particles of salts serving as nuclei. To insure an efficient cloud there must be an ample supply of steam.

An apparatus useful for carrying out this invention is shown in the drawings, in which—

Figure 1 is a longitudinal section, and

Figs. 2, 3, 4 and 5 are cross sections on lines 2—2, 3—3, 4—4 and 5—5, respectively, of Fig. 1.

The apparatus comprises a steam nozzle A which is threaded at its inner end as at $a$ and carries a nut $a^1$ by which and the opposing nut $a^2$ it may be attached to the ship's side or any desirable stationary point or standard. As shown, the passage of this steam nozzle is varying in diameter in order to secure desirable results. Upon the portion $a$ of the steam nozzle is screwed a base plate B to the forward end of which is attached a tubular delivery C. The passage through the delivery C is constructed somewhat, near its outer end as at $C^1$, like an injector. D and E are pipes leading to the sulfur-chlorid receptacles or supply. The pipe E leads into an annular, enlarged chamber $e$ from which leads a cylindrical passage $e^1$ extending a little beyond the end of the steam nozzle A and closed at its outer end except for perforations $e^2$ through which the sulfur-chlorid may be drawn by the action of the steam. A second similar cylindrical passage $d$ is located outside the passage $e$ similarly closed at its outer end and perforated as at $d^1$, this passage $d$ being connected with the source of sulfur-chlorid by the pipe D. By this means an ample supply of sulfur-chlorid may be drawn by the steam blast which acts as in the ordinary steam injector. The walls of these various passages are made by suitable cylindrical partitions supported from the base plate B, connected with the nozzle A and between it and the delivery C. A pipe F is connected to the source of ammonia. It feeds into a chamber $F^1$ from which project outwardly tubes $F^2$ positioned by the plate $f$ through which they pass and which at their upper ends are bent so that the streams of ammonia from these tubes tend to concentrate over the end of the delivery C, when they meet the jet of steam and sulfur-chlorid, the ammonia being under natural pressure and tending to escape. Around and outside of the tubes $F^2$ is a casing G through which pass screws $G^1$ to engage the outside of the part C and center it properly with relation to the other parts and hold it in place. H is an outer nozzle or casing forming a projection from the casing G.

The amount of sulfur-chlorid which is used in forming the cloud depends upon the degree of the vacuum, which vacuum depends upon the rate of flow of steam from the nozzle. The ammonia on the other hand has a pressure of its own and consequently to preserve the proper proportions and prevent waste the size of the orifice through which it is led should preferably be controlled by the same lever which turns on the steam, the valve as a whole being a specially constructed valve so that the proper proportions may be maintained.

The cloud may be thrown in any direction by changing the direction of the nozzle so that it forms a screen from the surface of the water to a considerable height, and it may be thrown out at any desired speed according to the steam pressure. The amount of the cloud formed depends upon how wide the valve is open which regulates the flow of steam.

The chemicals in the smoke cloud are harmless and will cause practically no corrosion of ship equipment or inconvenience to the operators or crew, which is an advantage over all other smoke clouds of which I have knowledge.

The chemicals required for the purpose are all of them inexpensive, but the cost may be lessened somewhat by bearing in mind the fact that sulfur is extremely soluble in sulfur-chlorid, dissolving to about 60% by weight of solution. A solution of sulfur in sulfur-chlorid may be used instead of the sulfur-chlorid itself, forming an admirable cloud when shot by means of the device described, the cloud, however, being yellower than the cloud made by using the sulfur-chlorid alone. Moreover, since a unit weight of such a solution contains less than a unit weight of sulfur-chlorid, less anhydrous ammonia is needed per unit weight of solution than per unit weight of sulfur-chlorid alone.

Sulfur chlorid is a harmless chemical when poured into water at ordinary temperature, therefore storage tanks containing this chemical will cause no inconvenience during action at sea. While this same chemical action takes place in cold water as in hot water or steam, in cold water the action is so very slow that the gases formed dissolve in the water and sulfur is precipitated, whereas in hot water or in steam the action is so violent as to cause explosion, and so rapid as to cause instantaneous and complete hydrolysis.

In place of ammonia another volatile base may be used. Sodium hydroxid and other strong and soluble bases when dissolved in water or a suitable solvent and fully atomized may also serve to produce a cloud, though one inferior to that above described.

For the volume of cloud produced the cost of the chemicals mentioned above is less than by any other method although, chemically speaking, the same result might be secured.

What I claim as my invention is:—

1. That method of producing a cloud screen which consists in feeding into a stream of steam under pressure bodies which upon hydrolysis form one or more acids, hydrolyzing the bodies, and bringing the acid or acids so formed into contact with ammonia, whereby their respective salts will be formed to serve as nuclei around which much of the excess of steam will condense and cluster.

2. That method of producing a cloud screen which consists in feeding minute particles of a substance which upon hydrolysis forms one or more acids into a stream of steam under pressure, the amount of steam being greatly in excess of the amount necessary to act by hydrolysis on said particles, and adding to the product so formed ammonia to form a salt or salts which serve as nuclei around which much of the excess of steam will condense and cluster.

3. That method of forming a cloud screen which consists in the hydrolysis of sulfur-chlorid by steam under pressure and causing the products of hydrolysis to react with ammonia to form a salt or salts in the form of nuclei around which may cluster particles of condensed vapor.

4. That method of producing a cloud screen which consists in throwing into the atmosphere particles of acids, steam and ammonia under pressure in a stream whereby salts will be formed and a portion of the steam will condense and cluster around the particles of the salts as nuclei to form a cloud-like mass.

5. That method of producing a cloud screen which consists in forcing into the atmosphere acids, a relatively large volume of steam under pressure and ammonia, whereby a portion of the ammonia will unite chemically with the acids to form salts which will serve as nuclei around which the excess of steam will condense and cluster to form a cloud.

TOWNES R. LEIGH.